United States Patent [19]

Kelley et al.

[11] Patent Number: 5,758,105

[45] Date of Patent: May 26, 1998

[54] METHOD AND APPARATUS FOR BUS ARBITRATION BETWEEN ISOCHRONOUS AND NON-ISOCHRONOUS DEVICES

[75] Inventors: Richard Allen Kelley, Apex, N.C.; Danny Marvin Neal, Round Rock, Tex.

[73] Assignee: International Business Machines Corporation, Armonk, N.Y.

[21] Appl. No.: 566,765

[22] Filed: Dec. 4, 1995

[51] Int. Cl.$^6$ .................................................. G06F 13/362
[52] U.S. Cl. .................................... 395/293; 395/729
[58] Field of Search .................................. 395/287–305, 395/728–732, 856–865

[56] References Cited

U.S. PATENT DOCUMENTS

| | | | |
|---|---|---|---|
| 4,755,938 | 7/1988 | Takahashi et al. | 395/729 |
| 5,001,652 | 3/1991 | Thompson | 395/250 |
| 5,146,596 | 9/1992 | Whittaker et al. | 395/296 |
| 5,148,545 | 9/1992 | Herbst et al. | 395/728 |
| 5,276,887 | 1/1994 | Haynie | 395/294 |
| 5,440,698 | 8/1995 | Sindhu et al. | 395/200.08 |
| 5,487,170 | 1/1996 | Bass et al. | 395/732 |
| 5,528,766 | 6/1996 | Ziegler et al. | 395/293 |
| 5,533,205 | 7/1996 | Blackledge, Jr. et al. | 395/297 |
| 5,546,547 | 8/1996 | Bowes et al. | 395/294 |
| 5,546,548 | 8/1996 | Chen et al. | 395/296 |
| 5,630,173 | 5/1997 | Oprescu | 395/860 |

*Primary Examiner*—Jack B. Harvey
*Assistant Examiner*—Sumati Lefkowitz
*Attorney, Agent, or Firm*—Mark E. McBurney; Thomas E. Tyson; Leslie A. Van Leeuwen

[57] ABSTRACT

An arbiter which allows a normal arbitration algorithm to be implemented for standard I/O devices, and an isochronous arbitration algorithm to be run for isochronous devices. Further, the isochronous devices can participate in the normal arbitration scheme when operating as a standard I/O device. A host bridge interconnects a system bus with an I/O bus, such as the PCI bus. The host bridge includes an arbiter with a normal arbitration algorithm, and, an isochronous arbitration algorithm implemented in either logic circuitry or software. Each I/O device (both standard devices and isochronous devices) connected to the I/O bus has a bus request line which transmits a request for control of the I/O bus to the arbiter. Depending on the state of the bus request control signal, the arbiter can determine which arbitration algorithm is to be utilized. For example, a standard device will drive the bus request signal active and hold it in its active state to indicate a standard bus request. In this case, the arbiter recognizes the standard request and runs a standard arbitration cycle. However, an isochronous device will pulse the bus request line to communicate an isochronous bus request and cause the arbiter to run an isochronous arbitration cycle. It can be seen that an isochronous device can operate as a standard device by activating its bus request signal and then maintaining it in the active state.

11 Claims, 3 Drawing Sheets

METHOD AND APPARATUS FOR BUS ARBITRATION BETWEEN ISOCHRONOUS AND NON-ISOCHRONOUS DEVICES

BACKGROUND OF THE INVENTION

1. Technical Field

The present invention generally relates to a data processing system which includes standard input/output (I/O) adapters and isochronous adapters. More specifically, the present invention provides a system and method for dynamically changing the bus arbitration scheme, based on the type of device requesting access to the bus.

2. Description of Related Art

Typically, data processing systems include a plurality of devices, such as a central processing system (CPU), system memory, L2 cache, I/O controllers, memory controllers, and the like interconnected to a system bus. Further, it is well known to have a mezzanine I/O bus such that a host bridge interfaces the system bus, with the mezzanine I/O bus, such as the Peripheral Component Interconnect (PCI) bus, Microchannel (MC) bus, or the like. For more information regarding the PCI bus, see the PCI bus specification, version 2.1, hereby incorporated by reference. By using a mezzanine I/O bus, additional I/O devices can be connected to the I/O bus. At various times, each I/O device will need to have control of the I/O bus to perform various data processing activities, such as providing data to the CPU, as in a load operation, or reading data from the CPU, as in a store operation. Typically, the various I/O devices will arbitrate for ownership, or control, of the bus. Arbitration schemes are known which implement an algorithm in logic circuitry, or software, such that a set of rules which will determine which one of the various I/O devices will successfully gain control of the bus. Further, conventional data processing systems will use a single arbitration scheme, implementing a single set of rules, for all devices on the bus. A common arbitration scheme is for each device to be assigned an arbitration level. For example, if there are eight (8) devices connected to the bus, each device may have an arbitration level of from 1 to 8, where the lower numbers indicate a higher priority. Thus, if device 1 and device 6 both request control of the I/O bus, then device 1 will be awarded control of the bus, based on its higher priority arbitration level. An arbiter circuit will initiate an arbitration cycle after a request is received from at least one of the I/O devices. During the arbitration cycle, the arbiter will compare the various arbitration levels of the devices requesting ownership of the bus, and grant access of the bus to the device having the highest priority.

Isochronous devices are considered very high priority devices which must have access to the bus, or risk losing unrecoverable data. For example, a graphics adapter which is interfacing an interactive, real time game, or the like, with a user, must have access to the bus in order to transfer information from the user (via the computer input, such as keyboard, joystick, mouse, trackball, or the like) to the CPU, or risk losing the data. More particularly, it is unacceptable to request the user to re-input the data during an interactive computer game, because the isochronous I/O graphics adapter was unable to transmit the input data to the processor since it did not have control of the bus. Another example of an isochronous device, is a "video on demand" type system where a consumer can order movies from a video service which is connected to the consumer's computer via a satellite link, telephone lines, or the like. In this case the isochronous I/O device which is connected to the computer must have access to the I/O bus or risk losing the data transmitted by the video service. Frame data is not provided to the processor when the I/O device does not have access to the bus. If the period of time between bus accesses is long enough, some frame data will be lost and the movie will appear to have jerky, rough and unnatural movements.

In both of the previous examples, it can be seen how the data provided to the isochronous I/O device must be sent to the processor, or it will be lost. It is unacceptable to have a viewer restart a movie, when various data is not provided to the processor, due to the bus being used by another device. Further, it can be seen how standard devices which may be reading data from a disk, or the like, can recover the data since it is stored on a tangible medium. On the other hand, with interactive, real time computer games and video on demand systems, there is no tangible medium to access to recover the data. And, these types of applications require that any periods of time where processing does not occur must be short enough to be imperceptible to a user.

Conventional systems which use both standard and isochronous devices will typically assign the highest priority to the isochronous devices, such that they will gain control of the bus when arbitrating against standard devices. Thus, an isochronous device may have an arbitration level of one (1) to ensure that it will win the standard arbitration cycle. However, a problem exists when more than one isochronous device is connected to a single bus.

Therefore, it can be seen that a need exists for a system which will allow both standard devices and isochronous devices to be connected to a single bus such that each set of devices has its own arbitration scheme. Further it would be desirable to allow an isochronous device to dynamically change its status between a standard device (using the standard arbitration scheme) and an isochronous device (using the isochronous arbitration scheme).

SUMMARY OF THE INVENTION

In contrast to the prior art, the present invention provides an arbiter which allows a normal arbitration algorithm to be implemented for standard I/O devices, and an isochronous arbitration algorithm to be run for isochronous devices. Further, the isochronous devices can participate in the normal arbitration scheme when operating as a standard I/O device.

Broadly, a host bridge is provided which interconnects a system bus with an I/O bus, such as the previously mentioned PCI bus. The host bridge includes an arbiter with a normal arbitration algorithm, and, an isochronous arbitration algorithm implemented in either logic circuitry or software. Each I/O device (both standard devices and isochronous devices) connected to the I/O bus has a bus request line which transmits a request for control of the I/O bus to the arbiter. Depending on the state of the bus request control signal, the arbiter can determine which arbitration algorithm is to be implemented. For example, a standard device will drive the bus request signal active and hold it in its active state to indicate a standard bus request. In this case, the arbiter recognizes the standard request and runs a standard arbitration cycle. However, an isochronous device will pulse the bus request line to communicate an isochronous bus request and cause the arbiter to run an isochronous arbitration cycle. It can be seen that an isochronous device can operate as a standard device by activating its bus request signal and then maintaining it in the active state. Thus, the present invention not only allows an arbiter to dynamically change between more than one arbitration scheme, it also provides for isochronous devices to operate in a standard, as well as isochronous mode.

In accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
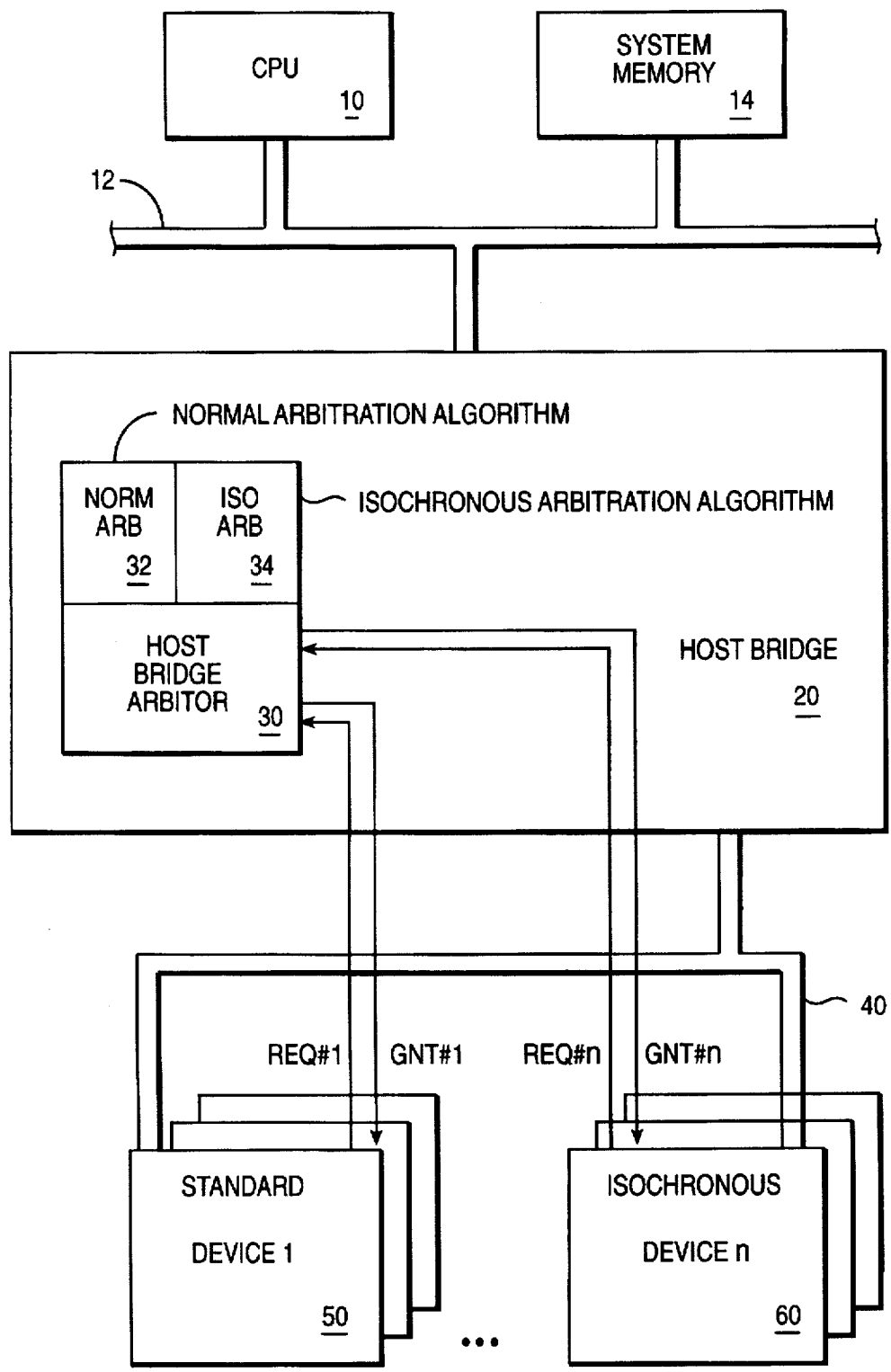
FIG. 1 is a schematic diagram showing the various components of the present invention that will allow standard and isochronous devices to request their corresponding types of arbitration schemes.

Referring to FIG. 1, the relevant components of a computer capable of implementing the present invention is shown. A CPU 10, such as one of the PowerPC microprocessors (PowerPC is a trademark of IBM Corp.) available from the IBM Corporation is shown and connected to a system bus 12. Memory 14 is also connected to system bus 12 wherein CPU 10 is capable of storing data to, and loading data from memory 14. Host bridge 20 interconnects system bus 12 with I/O bus 40, such as the aforementioned PCI bus. Those skilled in the art will understand how a bridge chip 20 is needed to connect different buses, due to their differences in protocol, message passing, control signal, handshaking, and the like. Among other things, bridge 20 provides a consistent interface between buses 12 and 40, such that devices attached to each bus can communicate with one another.

Host bridge 20 includes an arbiter 30 which controls the arbitration transaction for bus 40. Arbiter 30 receives bus request signals and issues bus grant signals to the various I/O devices connected to bus 40. Reference numeral 50 represents a plurality of standard devices (shown as Device 1) which are connected to I/O bus 40. This type of device could include small computer system interface (SCSI) adapters, co-processor cards, sound blaster cards, and the like. Each of these standard devices 50 includes a bus request signal line which is used to request ownership of the I/O bus 40.

Each of isochronous devices 60, such as an interactive graphics game card, video card, or the like, also include a bus request signal line for requesting control of bus 40. Further, there is a bus grant signal line from arbiter 30 to each of standard devices 50 and isochronous devices 60. Arbiter 30 will award control of bus 40 to one of the requesting devices by activating that particular device's bus grant control signal.

In accordance with the present invention, arbiter 30 includes a normal arbitration algorithm 32, which uses a specific set of rules or criteria to allocate control of bus 40 to various requesting devices 50. An isochronous arbitration algorithm 34 is also included in arbiter 30 which uses another set of rules or criteria to determine which one of the requesting isochronous devices 60 will be allocated access to the bus. As noted previously, a standard arbitration algorithm will basically compare the arbitration levels of the various standard devices competing for control of the bus to determine which of the devices has the highest priority. Bus 40 is then awarded to the device participating in the arbitration that has the highest priority. In order to request arbitration, a device 50 will activate its bus request signal (e.g. REQ#1). In a preferred embodiment, the bus request signal is a negative active signal, which means that a logical zero (0) indicates the signal is in its active state. Therefore, a logical one (1) on the bus request line will be considered inactive. For example, when not requesting control of bus 40, a device 50 will maintain a voltage (Vdd) on its bus request line. Then, when the device desires to access bus 40, a logical 0 (no voltage) is driven onto the bus request line. When arbiter 30 determines that there is a logical 0 on the bus request line from a device 50, an arbitration cycle is initiated. Arbiter 30 then compares the arbitration levels for the devices requesting the bus and awards the bus to the highest priority device by driving its bus grant signal low. The bus grant signal is also a negative active signal, therefore, arbiter 30 will place a logical 0 on the bus grant signal line of the device which successfully arbitrated for the bus. Those skilled in the art will understand that standard arbitration schemes include other criteria, such as how long a particular device has had control of the bus, how long since a device was awarded the bus, and the like.

Isochronous arbitration algorithm 34 is dependent on the type of data processing system and is likely to be more complex than standard arbitration algorithm 32. That is, multiple isochronous devices 60 will each require access to the bus within a specific period of time, or the unrecoverable data will be lost. This time period must be short enough to avoid any degradation of the application. As noted previously, in a video on demand system, if too many data frames (digitized images) are lost, then the output is unacceptably rough, blurred, or the like. Therefore, the system must know the through put of the images and ensure that the bus is awarded to the isochronous device 60 corresponding to the video on demand application in order to avoid degradation of the output to the user. The isochronous arbitration algorithm must take into account the timing requirements for all of the isochronous devices 60 such that each of them is awarded control of the I/O bus frequently enough to support their respective applications (e.g. video on demand and/or real time interactive computer games). Isochronous arbitration algorithm 34 also must consider the needs of the attached standard devices 50. That is, by definition isochronous devices 60 have a higher priority than standard devices 50. Thus, unless isochronous arbitration algorithm 34 considered standard devices 50, the isochronous devices 60 could (at least in some cases) monopolize control of bus 40 to the exclusion of standard devices 50.

Therefore, isochronous algorithm 34 must divide up the bus access time between devices 60 to ensure they can implement their respective operations without degrading performance, and allocate enough bus access time to standard devices 50 such that they can perform their designated tasks.

For example, assume there are five isochronous devices 60 and five standard devices 50 connected to bus 40. Also, assume that each of the five isochronous devices 60 requires at least 5 microseconds of access to bus 40 over each 100 microsecond period. Then, a possible isochronous arbitration method 34 may cause arbiter 30 to sequentially award control of bus 40 to each of the five isochronous devices 60 for a 5 microsecond interval with intermediate periods where standard devices 50 can also access bus 40 during that same 100 microsecond period.

Figure 3:
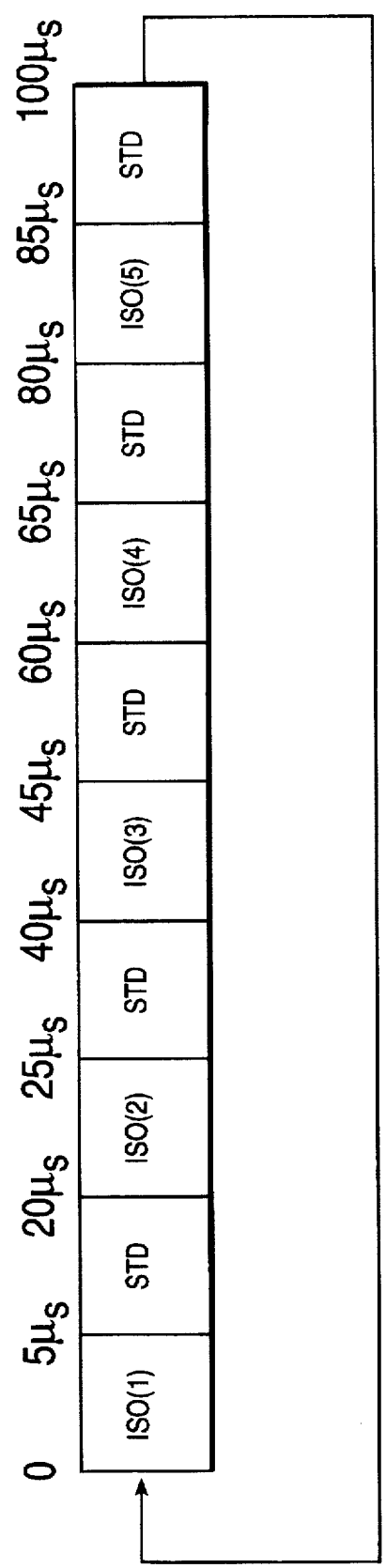
FIG. 3 shows a possible sequence of bus accesses with an isochronous arbitration algorithm which may be implemented by the present invention.

FIG. 3 illustrates this example by showing a representative 100 microsecond period. It is assumed that all of the isochronous devices 60 are requesting access to bus 40 by driving their bus request lines (REQ#n) low. Isochronous arbitration method 34 knows that all of the devices 60 must be able to access bus 40 within a specific period of time (in this case 100 microsecond) or data will be lost. Thus, arbitration method 34 will award the time period from 0 to 5 microsecond to the device 60 having the highest priority relative to other isochronous devices 60. During the time period from 5 to 20 microseconds, arbiter 30 releases bus 40 to allow standard devices 50 to access bus 40. If there are devices 50 which actually own the bus during this time period, their access is revoked at 20 microseconds, when arbiter 30 awards the bus to the next isochronous device 60 for the time period from 20 to 25 microseconds. At 25 microseconds bus 40 is released for potential access by standard devices 50. This sequence continues for the entire 100 microsecond period and then repeats. In this manner, each of the isochronous devices 60 has access to bus 40 for at least 5 microseconds out of every 100 microsecond period (25% of time when 5 devices at 5 microseconds each). And, bus 40 is available to be accessed by standard devices 50 for 75 microseconds out of every 100 microsecond period (75 percent of the time). Of course, this is merely one possible type of isochronous arbitration method 34 which could be implemented in arbiter 30, in conjunction with a standard arbitration method 32, to provide a system which dynamically switches between arbitration schemes.

In order to distinguish between a bus request using standard arbitration methods, i.e. a bus request from a standard device 50, and an isochronous bus request (from a device 60), multiple bus request signal lines could be used. However, a preferred embodiment of the present invention utilizes a single bus request line, with different types of signals indicating standard or isochronous requests. For example, driving the bus request signal line low and maintaining it at logical 0 will indicate to arbiter 30 that a device requesting standard arbitration algorithm 32 to be run is the one making the request. However, if a pulse signal is input on the bus request line, then arbiter 30 will be able to determine that the device requesting access is an isochronous device 60. Further, it can be seen how the present invention allows isochronous devices 60 to arbitrate as a standard device, depending on the type of signal input on its bus request line. That is, if a device 60 wishes to operate as a standard device during the time when it is initializing operations, such as establishing communications, verifying security codes, or the like it can drive and maintain its bus request line low and join in the standard arbitration. This can allow other isochronous devices 60, which may have a greater need to access the bus (actually transmitting unrecoverable data) the ability to control the bus more of the time. Then, when the device 60, which requested standard arbitration by transmitting a continuous logical 0, needs to have greater access to bus 40 it can go into isochronous mode and issue a bus request using a pulse. In this manner, isochronous devices 60 can switch modes between standard and isochronous modes. Of course, arbiter 30 will have to include a small amount of additional control circuitry that will distinguish between a continuous logical 0 request and a pulse request. Those skilled in the art will readily understand how this control circuitry can be implemented in hardware (or software) and included in arbiter 30. Also, it will be apparent to those skilled in the art to include circuitry in isochronous devices 60 for outputting a continuous logical 0 on its bus request line, or a pulse, depending on various conditions (e.g. initialization versus data transfer).

Figure 2:
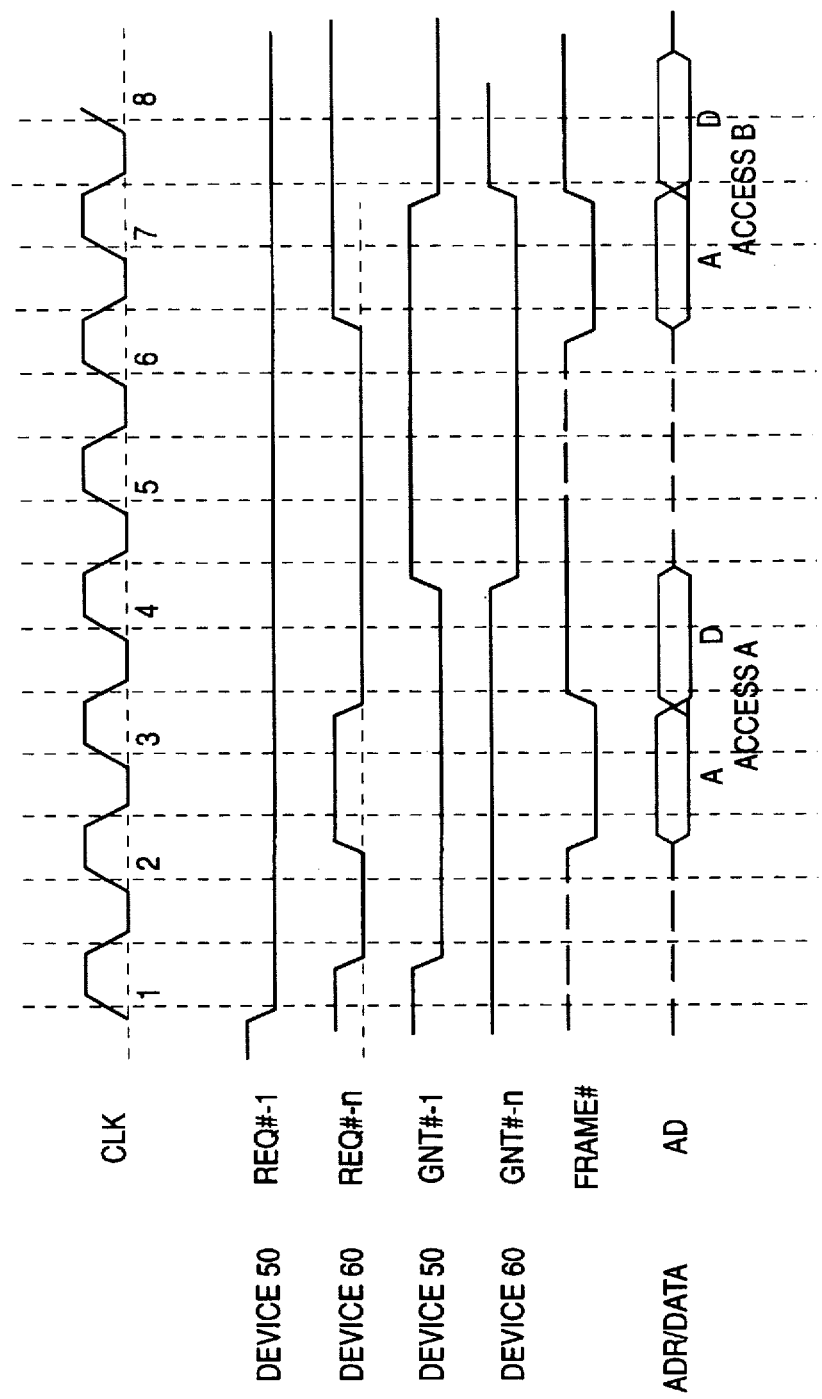
FIG. 2 is a timing diagram illustrating an example of the present invention wherein a standard device and an isochronous device are arbitrating for control of the I/O bus.

Referring to FIG. 2, a timing diagram is shown with the various control signals utilized by the present invention. A clock signal is shown which gates the circuits in the present invention. Seven cycles are shown in FIG. 2. Device(s) 50 is represented by the REQ#1 signal which is the bus request for standard devices 50. The REQ#n line is the bus request control line for isochronous devices 60. The bus is granted by arbiter 30 to one of the standard devices 50 by the GNT#1 control signal line. Similarly, arbiter 30 awards ownership of bus 40 to one of the isochronous devices 60 by using GNT#n control line. The FRAME# control line is a specific implementation of a PCI bus. It should be noted that all of the aforementioned signals are negative active signals, wherein a logical 0 indicates the active state and a logical 1 represents the inactive state. The address information and data is controlled using the AD control signal.

Next, a typical example of the present invention as shown in FIG. 2 will be described. Prior to clock cycle 1, device 50 drives the REQ#1 line low to a logical 0 (from its inactive state of logical 1). Arbiter 30 then awards bus 40 to device 50 during cycle 1 by activating the GNT#1 signal. This assumes that an arbitration cycle was run (as discussed above) between all of the standard devices and that device 50 had the highest priority. However, in this example, it is assumed that isochronous device 60 requests control of bus 40 during cycle 1 by pulsing its bus request signal (REQ#n) for one cycle, deactivating the request signal for another cycle, and then activating the signal once again. Arbiter 30 then recognizes the pulsed request on line REQ#n as an isochronous request and invokes the isochronous arbitration algorithm (embodied in circuitry, software or the like) during cycles 3 and 4. Assuming device 60 has successfully arbitrated for bus 40 (relative to other isochronous devices desiring access to the bus), arbiter 30 grants access to the bus by driving the GNT#n signal low during cycle 4. At the same time, the control by standard device 50 of bus 40 is terminated by deactivating its GNT#1 signal (driving the signal to its inactive, high state). It can be seen that standard device 50 was able to read or write address information ("A") and data ("D") between bus 40 (during cycles 2–4), as shown by signal AD (access A). Next, isochronous device 60 then writes address information and data to (or reads from) bus 40 during cycles 6–8 (access B). As noted earlier, the FRAME# control signal is PCI specific and is driven by the current bus master to indicate the beginning and duration of an access.

As noted previously, each of devices 50 and 60 includes a single request line (either REQ#1 or REQ#n). The present invention allows isochronous devices 60 to request access to bus 40 either as a standard device (using a continually maintained active signal) or an isochronous device (by pulsing the request signal). In order to implement this feature, the present invention does not require an additional I/O pin to be present on devices 60, or the addition of another bus request signal line. Since, devices 60 can vary their request signal, and arbiter 30 is capable of distinguishing between the different request signals (continuous or pulsed), then no additional pins or circuit lines are necessary in order to implement the present invention.

Also, it can be seen from FIG. 2 that device 50 continues to request access to bus 40 by maintaining its REQ#1 signal in an active state. However, once isochronous device 60 has been granted ownership of bus 40, it releases its REQ#n signal during cycle 6. At this time, the address information and data is assured of being transferred, via bus 40, during access B. This allows the arbiter to be reset for another arbitration cycle. Similarly, FIG. 2 shows how arbiter 30 will terminate the ownership of bus 40 by isochronous device 60 (once its REQ#n is deactivated) during cycle 7. Concurrently, arbiter 30 once again grants bus 40 to device 50 by activating its GNT#1 signal active during cycle 7.

Further, it can readily be seen how an isochronous device 60 can transmit a standard bus request signal (as shown by REQ#1), when standard operations are needed. In the alternative, device 60 could then transmit a pulsed bus request signal (as shown by REQ#n), when isochronous operations are required. Those skilled in the art will understand how control circuitry, such as a clocked driver circuit, or the like can be used to implement this aspect of the present invention in an isochronous device 60.

Although certain preferred embodiments have been shown and described, it should be understood that many changes and modification may be made therein without departing from the scope of the appended claims.

We claim:

1. A data processing system including an arbiter for allocating access to a bus which has a plurality of devices connected thereto, comprising:

first arbitration control means, in the arbiter, for awarding access of the bus to one of the devices based on a first arbitration scheme;

second arbitration control means, in the arbiter, for awarding access of the bus to one of the devices based on a second arbitration scheme; and means for switching between the first and second arbitration control means based upon a type of signal received from a device requesting bus access, wherein a first signal type indicates that the first arbitration control means is to be used and a second signal type indicates that the second arbitration control means is to be used; and wherein the devices comprise one or more first devices and one or more second devices, and wherein the first devices request bus access using the first signal type and the second devices request bus access using the first signal type under a first set of conditions and the second signal type under a second set of conditions.

2. A data processing system according to claim 1, wherein the first signal type comprises a continuous active bus request signal.

3. A data processing system according to claim 1, wherein the second signal type comprises a pulsed bus request control signal.

4. A data processing system according to claim 1, wherein the arbiter comprises means for distinguishing between the first signal type and the second signal type.

5. A data processing system according to claim 1, wherein the first signal type and the second signal type are transmitted on a single signal line.

6. A data processing system according to claim 1, wherein the first arbitration scheme is a non-isochronous arbitration scheme and the second arbitration scheme is an isochronous arbitration scheme.

7. A method for allocating access to a bus in a data processing system including an arbiter and a plurality of devices connected to the bus, comprising the steps of:

determining a type of signal received from a device requesting bus access;

awarding access to the bus based on a first arbitration scheme if a first signal type is received; and awarding access to the bus based on a second arbitration scheme if a second signal type is received;

wherein the devices comprise one or more first devices and one or more second devices, and wherein the first devices request bus access using the first signal type and the second devices request bus access using the first signal type under a first set of conditions and the second signal type under a second set of conditions.

8. A method according to claim 7, wherein the first signal type comprises a continuous active bus request signal.

9. A method according to claim 7, wherein the second signal type comprises a pulsed bus request control signal.

10. A method according to claim 7, further comprising the step of receiving the first signal type and the second signal type on a single signal line.

11. A method according to claim 7, wherein the first arbitration scheme is a non-isochronous arbitration scheme and the second arbitration scheme is an isochronous arbitration scheme.

\* \* \* \* \*